(12) United States Patent
Shi et al.

(10) Patent No.: US 12,163,482 B2
(45) Date of Patent: Dec. 10, 2024

(54) METHOD FOR CONTROLLING EGR RATE (EGR) OF A LOW PRESSURE EGR SYSTEM, SYSTEM AND VEHICLE

(71) Applicant: GUANGZHOU AUTOMOBILE GROUP CO., LTD., Guangzhou (CN)

(72) Inventors: Xinxin Shi, Guangzhou (CN); Xuetong Lian, Guangzhou (CN); Qingpeng Su, Guangzhou (CN); Weibo Zhao, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 0 days.

(21) Appl. No.: 18/108,790

(22) Filed: Feb. 13, 2023

(65) Prior Publication Data
US 2023/0193842 A1     Jun. 22, 2023

Related U.S. Application Data

(63) Continuation-in-part of application No. PCT/CN2021/116174, filed on Sep. 2, 2021.

(30) Foreign Application Priority Data

Sep. 14, 2020    (CN) .......................... 202010959271.5

(51) Int. Cl.
| | |
|---|---|
| *F02D 41/00* | (2006.01) |
| *F02M 26/00* | (2016.01) |
| *F02M 26/06* | (2016.01) |
| *F02M 26/07* | (2016.01) |
| *F02M 26/22* | (2016.01) |

(52) U.S. Cl.
CPC ........ *F02D 41/0072* (2013.01); *F02M 26/06* (2016.02); *F02M 26/22* (2016.02); *F02D 2041/0067* (2013.01)

(58) Field of Classification Search
CPC .... F02D 41/0072; F02M 26/06; F02M 26/22; F02M 26/07; F02M 2026/001; F02M 2026/003; F02M 2026/004
See application file for complete search history.

(56) References Cited

U.S. PATENT DOCUMENTS

2009/0277431 A1* 11/2009 Nitzke .................. F02M 26/10
                                                          60/311

* cited by examiner

*Primary Examiner* — Deming Wan
(74) *Attorney, Agent, or Firm* — ScienBiziP, P.C.

(57) ABSTRACT

The present disclosure provides a method for controlling EGR rate of a low pressure EGR system, a system and a vehicle. The method calculates a molar concentration of water molecules of exhaust gas processed by EGR cooler, calculates a molar concentration of water molecules, obtains coefficient as to excess air, and calculates a molar volume ratio of air according to the coefficient. Under a maximum limit of humidity, an allowable EGR rate of the exhaust gas processed by the EGR cooler is determined and an allowable EGR rate of the mixed gas before entry into supercharger and/or compressor is also determined, a lower EGR rate between the two allowable rates is set as a maximum for application actual working conditions. The present disclosure solves a problem of condensation caused by an introduction of exhaust gas from the existing gasoline engine.

18 Claims, 5 Drawing Sheets

```
┌─────────────────────────────────────────────────────────────────────────┐
│ A temperature of exhaust gas processed by an EGR cooler and a pressure  │
│ of the exhaust gas processed by the EGR cooler are obtained, a molar    │
│ concentration of water molecules of the exhaust gas processed by the    │─ 11
│ EGR cooler under a maximum humidity limit value is calculated according │
│ to the temperature of exhaust gas processed by the EGR cooler, the      │
│ pressure of the exhaust gas processed by the EGR cooler, a preset       │
│ maximum humidity limit value of the exhaust gas processed by the EGR    │
│ cooler                                                                  │
└─────────────────────────────────────────────────────────────────────────┘
                                     │
                                     ▼
┌─────────────────────────────────────────────────────────────────────────┐
│ A temperature of a mixed gas before the mixed gas is processed by a     │
│ supercharger and a compressor, and a pressure of the mixed gas before   │
│ being processed by the supercharger and the compressor are obtained; a  │
│ molar concentration of water molecules under a maximum humidity limit   │─ 12
│ value of the mixed gas before being processed the supercharger and the  │
│ compressor is calculated according to the temperature of the mixed gas  │
│ before being processed by the supercharger and the compressor, and the  │
│ pressure of the mixed gas before being processed by the supercharger    │
│ and the compressor, a preset maximum humidity limit value of the mixed  │
│ gas before being processed by the supercharger and the compressor       │
└─────────────────────────────────────────────────────────────────────────┘
                                     │
                                     ▼
┌─────────────────────────────────────────────────────────────────────────┐
│ An excess air coefficient is obtained, and a molar volume ratio of an   │
│ air is calculated according to a relative volume of nitrogen to oxygen  │─ 13
│ in the air, a relative volume of carbon dioxide relative to the oxygen  │
│ in the air, a relative volume of water molecules relative to the oxygen │
│ in the air, and the excess air coefficient                              │
└─────────────────────────────────────────────────────────────────────────┘
                                     │
                                     ▼
┌─────────────────────────────────────────────────────────────────────────┐
│ An allowable EGR rate of the exhaust gas processed by the EGR cooler    │
│ under the maximum humidity limit value is calculated according to the   │
│ molar concentration of the water molecules and the molar volume ratio   │
│ of the air of the exhaust gas processed by the EGR cooler under the     │─ 14
│ maximum humidity limit value; an allowable EGR rate of the mixed gas    │
│ before being processed by the supercharger and the compressor under the │
│ maximum humidity limit value is calculated according to the molar       │
│ concentration of the water molecules and the molar volume ratio of the  │
│ air of the mixed gas before being processed by the supercharger and     │
│ the compressor under the maximum humidity limit value                   │
└─────────────────────────────────────────────────────────────────────────┘
                                     │
                                     ▼
┌─────────────────────────────────────────────────────────────────────────┐
│ A smaller EGR rate is determined between the allowable EGR rate of the  │
│ mixed gas before being processed by the supercharger and the compressor │─ 15
│ under the maximum humidity limit value, and the allowable EGR rate of   │
│ the exhaust gas processed by the EGR cooler under the maximum humidity  │
│ limit value, and the smaller EGR rate is taken as a maximum limit value │
│ of an EGR rate in actual working conditions                             │
└─────────────────────────────────────────────────────────────────────────┘
```

FiG.2

METHOD FOR CONTROLLING EGR RATE (EGR) OF A LOW PRESSURE EGR SYSTEM, SYSTEM AND VEHICLE

This application is a continuation-in-part of International Application No. PCT/CN2021/116174, filed on Sep. 2, 2021.

FIELD

The subject matter herein generally relates to an engine control technology field, in particular, relates to a method for controlling EGR rate of a low pressure EGR system, a system for controlling EGR rate of low pressure EGR system, and a vehicle.

BACKGROUND

Low Pressure-Exhaust Gas Recirculation (LP-EGR) is currently in vogue for energy saving and emission reduction of gasoline engines. The LP-EGR principle refers to: exhaust gas produced by the combustion of the gasoline engine being cooled and then passed again into an intake system. Triatomic molecules such as CO2 and water molecules with large specific heat capacity are used to dilute a charge in a cylinder, and reduce the combustion temperature in the cylinder under heavy load, and suppress knocking, increase a compression ratio, reduce exhaust temperature; increase throttle opening to reduce pumping losses under small and medium load, therefore, improving gasoline engine fuel economy and emissions performance over the entire operating range of the engine.

In order to cool the exhaust gas produced by the combustion of the gasoline engine and then pass the exhaust gas into an intake system again, on a basis of the original air system, the exhaust gas after processing by a pre-catalyst is introduced into a turbocharger compressor. Simultaneously, in order to realize control and estimate the amount of introduced exhaust gas, corresponding actuators and sensors are added to pipelines. Referring to FIG. 1, actuators include mixing valves and EGR valves and the sensors include intake air flow meters sensors, temperature, and pressure sensors installed before or after the compressor.

For the entire gasoline engine control system, a function of LP-EGR system is to ensure that the gasoline engine can accurately control an amount of exhaust gas and fresh air entering the cylinder in each cycle according to requirements of the work it is doing, and simultaneously to ensure that the reliability and life of a booster system and other related system components are not affected by the LP-EGR system. Under certain working conditions, if the exhaust gas is condensed when introduced into the intake system, it will cause damage to a compressor impeller of a supercharger and affect the reliability and life of the engine components. Therefore, it is necessary to avoid the above described occurrences.

SUMMARY

The present disclosure provides a method for controlling EGR rate of a low pressure EGR system, a system for controlling EGR rate of low pressure EGR system, and a vehicle, to avoid damaging a compressor impeller of a supercharger and affecting the reliability and life of the engine components if the exhaust gas is in a condensed state.

In order to solve the above-mentioned technical problem, a method for controlling EGR rate of low pressure EGR system is provided, the method including: step 11, obtaining a temperature of exhaust gas processed by an EGR cooler and a pressure of the exhaust gas processed by the EGR cooler; calculating a molar concentration of water molecules of the exhaust gas processed by the EGR cooler under a maximum humidity limit value according to the temperature of exhaust gas processed by the EGR cooler, the pressure of the exhaust gas processed by the EGR cooler, and a preset maximum humidity limit value of the exhaust gas processed by the EGR cooler; step 12, obtaining a temperature of a mixed gas before the mixed gas is processed by a supercharger and a compressor, and a pressure of the mixed gas before being processed by the supercharger and the compressor; calculating a molar concentration of water molecules under a maximum humidity limit value of the mixed gas before being processed by the supercharger and the compressor according to the temperature of the mixed gas before being processed, and the pressure of the mixed gas before being processed, and a preset maximum humidity limit value of the mixed gas before being processed by the supercharger and the compressor; step 13, obtaining an excess air coefficient, and calculating a molar volume ratio of air according to a relative volume of nitrogen to oxygen in the air, a relative volume of carbon dioxide relative to the oxygen in the air, a relative volume of water molecules relative to the oxygen in the air, and the excess air coefficient; step 14, calculating an allowable EGR rate of the exhaust gas processed by the EGR cooler under the maximum humidity limit value according to the molar concentration of the water molecules and the molar volume ratio of the air of the exhaust gas processed by the EGR cooler under the maximum humidity limit value; calculating an allowable EGR rate of the mixed gas before being processed by the supercharger and the compressor under the maximum humidity limit value according to the molar concentration of the water molecules and the molar volume ratio of the air of the mixed gas before being processed by the supercharger and the compressor under the maximum humidity limit value; step 15, determining a smaller EGR rate between the allowable EGR rate of the mixed gas before being processed by the supercharger and the compressor under the maximum humidity limit value, and the allowable EGR rate of the exhaust gas processed by the EGR cooler under the maximum humidity limit value; and taking the smaller EGR rate as a maximum limit of an EGR rate in actual working conditions.

Furthermore, step 11 further includes: step 21, substituting the temperature of the exhaust gas processed by the EGR cooler into the formula $$P_{svpin} = 10^{\left[2.76 + \frac{7.502(T_{in} - 273.15)}{T_{in} - 35.85}\right]}, \quad (1)$$

and calculating a saturation vapor pressure of the exhaust gas processed by the EGR cooler, wherein $P_{svpin}$ is the saturation vapor pressure of the exhaust gas processed by the EGR cooler, and $T_{in}$ is the temperature of the exhaust gas processed by an EGR cooler; step 22, substituting the saturation vapor pressure of the exhaust gas processed by the EGR cooler, the pressure of the exhaust gas processed by the EGR cooler, and the preset maximum humidity limit value of the exhaust gas processed by the EGR cooler into formula $$RH_{in} = [H_2O]_{in} \frac{P_{in}}{P_{svpin}}, \quad (2)$$

and calculating the molar concentration of water molecules of the exhaust gas processed by the EGR cooler under the maximum humidity limit value, wherein $RH_{in}$ is a humidity of the exhaust gas, $[H_2O]_{in}$ is the molar concentration of water molecules, $P_{in}$ is the temperature of the exhaust gas, and $P_{svpin}$ is the saturation vapor pressure of the exhaust gas.

Furthermore, step 12 further includes: step 31, substituting the temperature of the mixed gas before being processed by the supercharger and the compressor into the formula $$P_{svpin} = 10^{\left[2.76 + \frac{7.502(T_{in} - 273.15)}{T_{in} - 35.85}\right]}, \quad (1)$$

and calculating a saturation vapor pressure of the mixed gas before being processed by the supercharger and the compressor, wherein $P_{svpin}$ is the saturation vapor pressure of the mixed gas, and $T_{in}$ is the temperature of the mixed gas; step 32, substituting the saturation vapor pressure of the mixed gas before being processed by the supercharger and the compressor, the pressure of the mixed gas before being processed by the supercharger and the compressor, and the preset maximum humidity limit value of the mixed gas before being processed by the supercharger and the compressor into a formula $$RH_{in} = [H_2O]_{in} \frac{P_{in}}{P_{svpin}}; \quad (2)$$

calculating the molar concentration of water molecules of the exhaust gas processed by the EGR cooler under the maximum humidity limit value, wherein $RH_{in}$ is a humidity of the mixed gas, $[H_2O]_{in}$ is the molar concentration of water molecules, $P_{in}$ is the temperature of the mixed gas, and $P_{svpin}$ is the saturation vapor pressure of the mixed gas.

Furthermore, step 13 further comprises: obtaining the excess air coefficient $Z_{airFuel}$ by an oxygen sensor; calculating the molar volume ratio of the air according to formula $$Z_{airFuel} = \frac{A(M_{O2} + xM_{N2} + yM_{CO2} + zM_{H2O})}{M_{CH_n}}; \quad (3)$$

wherein, A is the molar volume ratio of the air, x is the relative volume of the nitrogen to the oxygen in the air, y is the relative volume of the carbon dioxide relative to the oxygen in the air, z is the relative volume of the water molecules relative to the oxygen in the air, $M_{O2}$ is a relative molecular mass of the oxygen, $M_{N2}$ is a relative molecular mass of the nitrogen, $M_{CO2}$ is a relative molecular mass of the carbon dioxide, $M_{H2O}$ is a relative molecular mass of the water molecules, and $M_{CH_n}$ is a relative molecular mass of the gasoline.

Furthermore, in step 14, calculating the allowable EGR rate of the exhaust gas processed by the EGR cooler under the maximum humidity limit value according to the molar concentration of the water molecules and the molar volume ratio of the air of the exhaust gas processed by the EGR cooler under the maximum humidity limit value further includes: according to a gasoline engine working in an equivalent mode or in an enriched mode, obtaining a statistical chemical equation of a gasoline combustion of the gasoline engine $CH_n + A[O_2 + xN_2 + yCO_2 + zH_2O] + B[aCO_2 + cH_2O + eO_2 + gCH_n + hN_2]$ (4), wherein n is a relative atomic ratio of hydrogen to carbon in gasoline, which is approximately equal to 1.87, A is the molar volume ratio of the air, B is molar volume ratio of an introduced exhaust gas, x is the relative volume of the nitrogen to the oxygen in the air, y is the relative volume of the carbon dioxide relative to the oxygen in the air, z is the relative volume of the water molecules relative to the oxygen in the air, a is the molar concentration of the carbon dioxide of the introduced exhaust gas, c is the molar concentration of the water molecules of the introduced exhaust gas, e is the molar concentration of the oxygen of the introduced exhaust gas, g is the molar concentration of hydrocarbons of the introduced exhaust gas, and h is the molar concentration of hydrocarbons of the introduced exhaust gas; according to the statistical chemical equation, determining a system of equations $$\begin{cases} a1 = \frac{1 + Ay}{1 - B1} - g1 \\ c1 = \frac{\frac{n}{2} + Az}{1 - B1} - \frac{ng1}{2} \\ g1 = \frac{1 + \frac{n}{4} - A}{(1 - B1) \cdot \left(1 + \frac{n}{4}\right)} \\ h1 = \frac{Ax}{1 - B1} \end{cases} \quad (5)$$

substituting the molar volume ratio of air into A of the system of equations, and substituting the molar concentration of the water molecules of a first introduced exhaust gas into c1, to calculate the molar concentration a1 of the carbon dioxide of a first introduced exhaust gas, the molar concentration e1 of the oxygen of the first introduced exhaust gas, the molar concentration g1 of the hydrocarbons of the first introduced exhaust gas, and the molar volume ratio B1 of the first introduced exhaust gas, wherein the exhaust gas processed by the EGR cooler under the maximum humidity limit value is the first introduced exhaust gas; according to the molar volume ratio of air into A, the molar volume ratio B1 of the first introduced exhaust gas, the molar concentration a1 of the carbon dioxide of the first introduced exhaust gas, the molar concentration c1 of the water molecules of the first introduced exhaust gas, the molar concentration e1 of the oxygen of the first introduced exhaust gas, the molar concentration g1 of the hydrocarbons of the first introduced exhaust gas, and calculating the allowable EGR rate of the exhaust gas processed by the EGR cooler under the maximum humidity limit value according to formula $$Z_{egr}1 = \frac{B1(a1M_{CO2} + c1M_{H2O} + g1M_{CHn} + h1M_{N2})}{A(M_{O2} + xM_{N2} + yM_{CO2} + zM_{H2O}) +} \\ B1(a1M_{CO2} + c1M_{H2O} + g1M_{CHn} + h1M_{N2})$$

(formula (6)), wherein $Z_{egr}1$ is the allowable EGR rate of the exhaust gas processed by the EGR cooler under the maximum humidity limit value.

Furthermore, in step 14, the calculating of the allowable EGR rate of the mixed gas before being processed by the supercharger and the compressor under the maximum humidity limit value according to the molar concentration of the water molecules and the molar volume ratio of the air of the mixed gas before being processed by the supercharger and the compressor under the maximum humidity limit value further comprises: according to the gasoline engine working in an equivalent mode or in an enriched mode, obtaining the statistical chemical equation of the gasoline combustion of the gasoline engine $CH_n+A[O_2+xN_2+yCO_2+zH_2O]+B[aCO_2+cH_2O+eO_2+gCH_n+hN_2]$ (4), wherein n is the relative atomic ratio of the hydrogen to the carbon in the gasoline, which is approximately equal to 1.87, A is the molar volume ratio of the air, B is the molar volume ratio of an introduced exhaust gas, x is the relative volume of the nitrogen to the oxygen in the air, y is the relative volume of the carbon dioxide relative to the oxygen in the air, z is the relative volume of the water molecules relative to the oxygen in the air, and a is the molar concentration of the carbon dioxide of the introduced exhaust gas. c is the molar concentration of the water molecules of the introduced exhaust gas, e is the molar concentration of the oxygen of the introduced exhaust gas, g is the molar concentration of hydrocarbons of the introduced exhaust gas, and h is the molar concentration of the hydrocarbons of the introduced exhaust gas; according to the formula (4), determining the system of equations $$\begin{cases} a2 = \dfrac{1+Ay}{1-B2} - g2 \\ c2 = \dfrac{\frac{n}{2}+Az}{1-B2} - \dfrac{ng2}{2} \\ g2 = \dfrac{1+\frac{n}{4}-A}{(1-B2)\cdot\left(1+\frac{n}{4}\right)} \\ h2 = \dfrac{Ax}{1-B2} \end{cases} \quad (7)$$

substituting the molar volume ratio of air into A of the system of equations, and substituting the molar concentration of the water molecules of a second introduced exhaust gas into c2, to calculate the molar concentration a2 of the carbon dioxide of the second introduced exhaust gas, the molar concentration e2 of the oxygen of the second introduced exhaust gas, the molar concentration g2 of the hydrocarbons of the second introduced exhaust gas, and the molar volume ratio B2 of the second introduced exhaust gas, where the mixed gas before being processed by the supercharger and the compressor under the maximum humidity limit value is the second introduced exhaust gas; according to the molar volume ratio of air into A, the molar volume ratio B2 of the second introduced exhaust gas, the molar concentration a2 of the carbon dioxide of the second introduced exhaust gas, the molar concentration c2 of the water molecules of the second introduced exhaust gas, the molar concentration e2 of the oxygen of the second introduced exhaust gas, the molar concentration g2 of the hydrocarbons of the second introduced exhaust gas, calculating the allowable EGR rate of the mixed gas before being processed by the supercharger and the compressor under the maximum humidity limit value according to formula $$Z_{egr}2 = \dfrac{B2(a2M_{CO2} + c2M_{H2O} + g2M_{CHn} + h2M_{N2})}{A(M_{O2} + xM_{N2} + yM_{CO2} + zM_{H2O}) + B2(a2M_{CO2} + c2M_{H2O} + g2M_{CHn} + h2M_{N2})}, \quad (6)$$

wherein $Z_{egr}2$ is the allowable EGR rate of the mixed gas before being processed by the supercharger and the compressor under the maximum humidity limit value.

The present disclosure further provides a system for controlling Exhaust Gas Recirculation (EGR) rate of a low pressure EGR system, the system including: a first calculation unit, configured to obtain a temperature of exhaust gas processed by an EGR cooler and a pressure of the exhaust gas processed by the EGR cooler; calculating a molar concentration of water molecules of the exhaust gas processed by the EGR cooler under a maximum humidity limit value according to the temperature of exhaust gas processed by the EGR cooler, the pressure of the exhaust gas processed by the EGR cooler, a preset maximum humidity limit value of the exhaust gas processed by the EGR cooler; a second calculation unit configured to obtain a temperature of a mixed gas before processing by a supercharger and a compressor, and a pressure of the mixed gas before such processing; calculating a molar concentration of water molecules under a maximum humidity limit value of the mixed gas before being processed by the supercharger and the compressor according to the temperature of the mixed gas before such processing, and the pressure of the mixed gas before such processing, and a preset maximum humidity limit value of the mixed gas before being processed by the supercharger and the compressor; a third calculation unit, configured to obtain an excess air coefficient, and calculating a molar volume ratio of air according to a relative volume of nitrogen to oxygen in the air, a relative volume of carbon dioxide relative to the oxygen in the air, a relative volume of water molecules relative to the oxygen in the air, and the excess air coefficient; a fourth calculation unit, configured to calculate an allowable EGR rate of the exhaust gas processed by the EGR cooler under the maximum humidity limit value according to the molar concentration of the water molecules and the molar volume ratio of the air of the exhaust gas processed by the EGR cooler under the maximum humidity limit value; calculating an allowable EGR rate of the mixed gas before being processed by the supercharger and the compressor under the maximum humidity limit value according to the molar concentration of the water molecules and the molar volume ratio of the air of the mixed gas before being processed by the supercharger and the compressor under the maximum humidity limit value; a control unit configured to determine a smaller EGR rate between the allowable EGR rate of the mixed gas before being processed by the supercharger and the compressor under the maximum humidity limit value, and the allowable EGR rate of the exhaust gas processed by the EGR cooler under the maximum humidity limit value; the smaller EGR rate is taken as a maximum limit of an EGR rate in actual working conditions.

Furthermore, the first calculation unit further substitutes the temperature of the exhaust gas processed by the EGR cooler into the formula $$P_{svpin} = 10^{\left[2.76+\frac{7.502(T_{in}-273.15)}{T_{in}-35.85}\right]}; \quad (1)$$

and calculates a saturation vapor pressure of the exhaust gas processed by the EGR cooler, wherein $P_{svpin}$ is the saturation vapor pressure of the exhaust gas processed by the EGR cooler, and $T_{in}$ is the temperature of the exhaust gas processed by an EGR cooler; the saturation vapor pressure of the exhaust gas processed by the EGR cooler, the pressure of the exhaust gas processed by the EGR cooler, and the preset maximum humidity limit value of the exhaust gas processed the EGR cooler are substituted into formula $$RH_{in} = [H_2O]_{in} \frac{P_{in}}{P_{svpin}}; \quad (2)$$

and the molar concentration of water molecules of the exhaust gas processed by the EGR cooler under the maximum humidity limit value is calculated, wherein $RH_{in}$ is a humidity of the exhaust gas, $[H_2O]_{in}$ is the molar concentration of water molecules, $P_{in}$ is the temperature of the exhaust gas, and $P_{svpin}$ is the saturation vapor pressure of the exhaust gas.

Furthermore, the second calculation unit further substitutes the temperature of the mixed gas before being processed by the supercharger and the compressor into the formula $$P_{svpin} = 10^{\left[2.76 + \frac{7.502(T_{in} - 273.15)}{T_{in} - 35.85}\right]}; \quad (1)$$

and calculates a saturation vapor pressure of the mixed gas before being processed by the supercharger and the compressor, wherein $P_{svpin}$ is the saturation vapor pressure of the mixed gas, and $T_{in}$ is the temperature of the mixed gas; the saturation vapor pressure of the mixed gas before being processed by the supercharger and the compressor, the pressure of the mixed gas before such processing, and the preset maximum humidity limit value of the mixed gas before being processed by the supercharger and the compressor are substituted into formula $$RH_{in} = [H_2O]_{in} \frac{P_{in}}{P_{svpin}}; \quad (2)$$

the molar concentration of water molecules of the exhaust gas processed by the EGR cooler under the maximum humidity limit value is calculated, wherein $RH_{in}$ is a humidity of the mixed gas, $[H_2O]_{in}$ is the molar concentration of water molecules, $P_{in}$ is the temperature of the mixed gas, and $P_{svpin}$ is the saturation vapor pressure of the mixed gas.

The present disclosure provides a vehicle, the vehicle includes the system for controlling EGR rate of a low pressure EGR system.

Furthermore, the first calculation unit further: substitutes the temperature of the exhaust gas processed by the EGR cooler into the formula $$P_{svpin} = 10^{\left[2.76 + \frac{7.502(T_{in} - 273.15)}{T_{in} - 35.85}\right]}; \quad (1)$$

and calculates a saturation vapor pressure of the exhaust gas processed by the EGR cooler, wherein $P_{in}$ is the saturation vapor pressure of the exhaust gas processed by the EGR cooler, and $T_{in}$ is the temperature of the exhaust gas processed by an EGR cooler; substituting the saturation vapor pressure of the exhaust gas processed by the EGR cooler, the pressure of the exhaust gas processed by the EGR cooler, and the preset maximum humidity limit value of the exhaust gas processed the EGR cooler into a formula $$RH_{in} = [H_2O]_{in} \frac{P_{in}}{P_{svpin}}; \quad (2)$$

and calculating the molar concentration of water molecules of the exhaust gas processed by the EGR cooler under the maximum humidity limit value, wherein $RH_{in}$ is a humidity of the exhaust gas, $[H_2O]_{in}$ is the molar concentration of water molecules, $P_{in}$ is the temperature of the exhaust gas, and $P_{svpin}$ is the saturation vapor pressure of the exhaust gas.

Furthermore, the second calculation unit further: substitutes the temperature of the mixed gas before being processed by the supercharger and the compressor into the formula $$P_{svpin} = 10^{\left[2.76 + \frac{7.502(T_{in} - 273.15)}{T_{in} - 35.85}\right]}; \quad (1)$$

and calculates a saturation vapor pressure of the mixed gas before being processed by the supercharger and the compressor, wherein $P_{svpin}$ is the saturation vapor pressure of the mixed gas, and $T_{in}$ is the temperature of the mixed gas; substitute the saturation vapor pressure of the mixed gas before being processed by the supercharger and the compressor, the pressure of the mixed gas before such processing, and the preset maximum humidity limit value of the mixed gas before such processing into a formula $$RH_{in} = [H_2O]_{in} \frac{P_{in}}{P_{svpin}}; \quad (2)$$

and calculates the molar concentration of water molecules of the exhaust gas processed by the EGR cooler under the maximum humidity limit value, wherein $RH_{in}$ in is a humidity of the mixed gas, $[H_2O]_{in}$ is the molar concentration of water molecules, $P_{in}$ is the temperature of the mixed gas, and $P_{svpin}$ is the saturation vapor pressure of the mixed gas.

The present disclosure provides the following advantages. The present disclosure calculates step by step the allowable EGR rate of the mixed gas before being processed by the supercharger and the compressor under the maximum humidity limit value, and the allowable EGR rate of the exhaust gas processed by the EGR cooler under the maximum humidity limit value; determines a smaller EGR rate between the two allowable EGR rates, ensures that the exhaust gas processed by the EGR cooler does not condense, and ensures that the mixed gas before being processed by the supercharger and the compressor does not condense without adding a humidity sensor, therefore solving the problem that under certain working conditions, if the exhaust gas condenses when the exhaust gas is introduced into the intake system, impeller damage of the compressor in the supercharger is caused and the reliability and life of the engine components are affected, therefore reducing hardware costs.

BRIEF DESCRIPTION OF THE DRAWINGS

In order to more clearly illustrate the embodiments of the present disclosure or the technical solutions in the prior art, the following will briefly introduce accompanying drawings that need to be used in the description of the embodiments or the prior art. The accompanying drawings in the following description are only some embodiments of the present disclosure, and those skilled in the art can obtain other drawings without any creative effort.

FIG. 2 is a flowchart of one embodiment of a method for controlling EGR rate of a low pressure EGR system.

DETAILED DESCRIPTION

Figure 1:
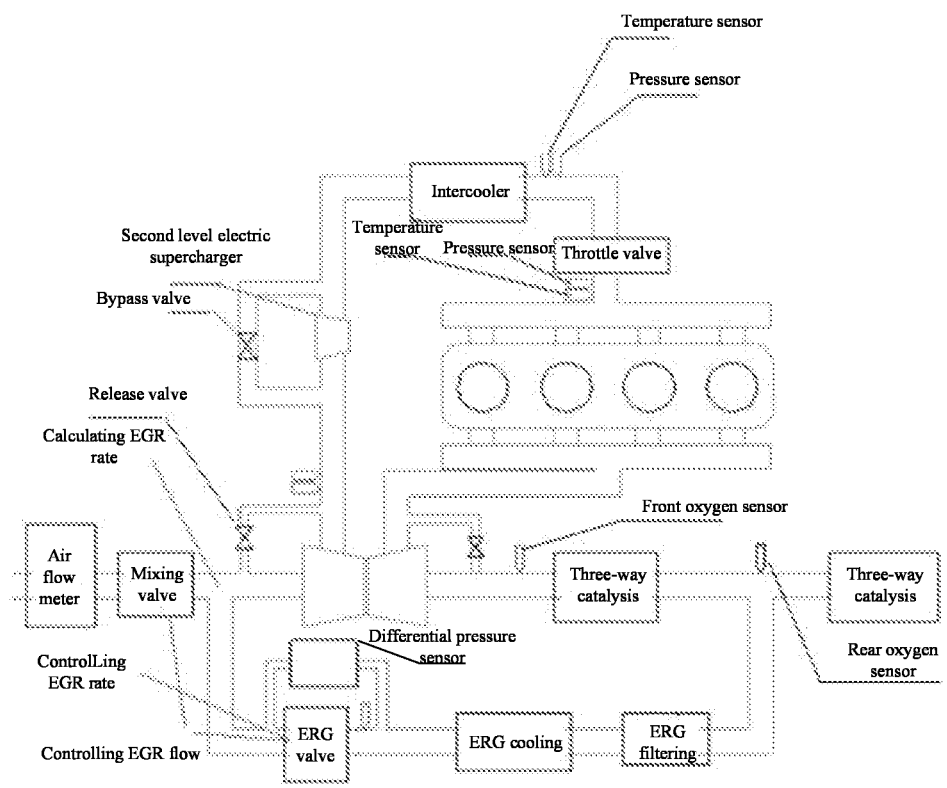
FIG. 1 is a structure diagram of a low pressure EGR system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Implementations of the present disclosure will now be described, by way of embodiment, with reference to the attached figures.

FIG. 2 illustrates a flowchart of a method for controlling EGR rate of low pressure EGR system. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at step 11.

At step 11, a temperature of exhaust gas processed by an EGR cooler and a pressure of the exhaust gas processed by the EGR cooler are obtained, a molar concentration of water molecules of the exhaust gas processed by the EGR cooler under a maximum humidity limit value is calculated according to the temperature of exhaust gas processed by the EGR cooler, the pressure of the exhaust gas processed by the EGR cooler, and a preset maximum humidity limit value of the exhaust gas processed by the EGR cooler.

Figure 3:
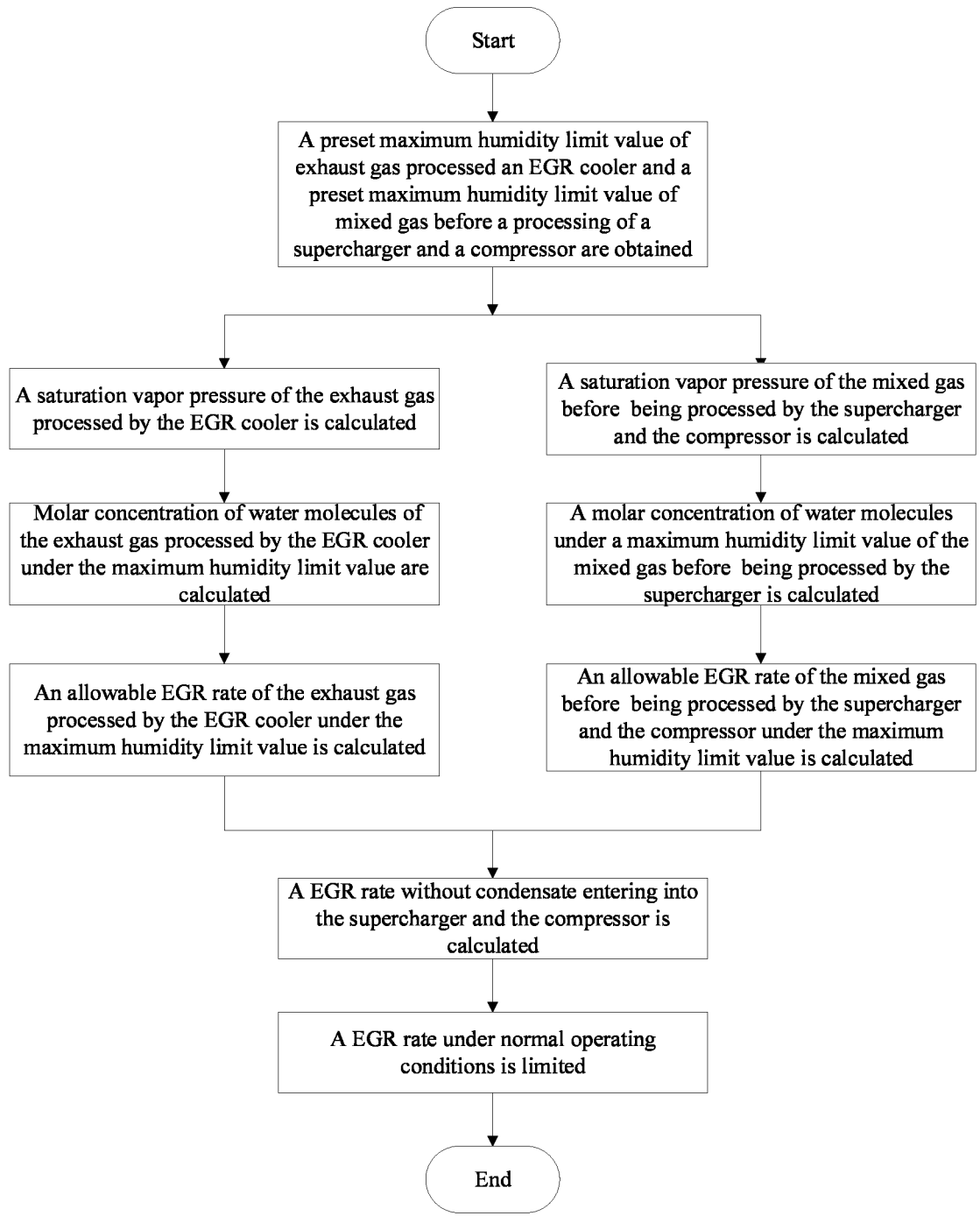
FIG. 3 is a flowchart of another embodiment of a method for controlling EGR rates of a low pressure EGR system.

In one embodiment, the temperature of exhaust gas processed by an EGR cooler is obtained by a temperature sensor, and the pressure of the exhaust gas processed by the EGR cooler is obtained by a pressure sensor. In one embodiment, FIG. 3 illustrates the process of step 11.

In one embodiment, step 11 includes:

step 21, substituting the temperature of the exhaust gas processed by the EGR cooler into the formula $$P_{svpin} = 10^{\left[2.76 + \frac{7.502(T_{in} - 273.15)}{T_{in} - 35.85}\right]}, \quad (1)$$

and calculating a saturation vapor pressure of the exhaust gas processed by the EGR cooler, where $P_{svpin}$ is the saturation vapor pressure of the exhaust gas processed by the EGR cooler, and $T_{in}$ is the temperature of the exhaust gas processed by an EGR cooler;

step 22, substituting the saturation vapor pressure of the exhaust gas processed by the EGR cooler, the pressure of the exhaust gas processed by the EGR cooler, and the preset maximum humidity limit value of the exhaust gas processed the EGR cooler into a formula $$RH_{in} = [H_2O]_{in} \frac{P_{in}}{P_{svpin}}, \quad (2)$$

calculating the molar concentration of water molecules of the exhaust gas processed by the EGR cooler under the maximum humidity limit value, where $RH_{in}$ is a humidity of the exhaust gas, $[H_2O]_{in}$ is the molar concentration of water molecules, $P_{in}$ is the temperature of the exhaust gas, and $P_{svpin}$ is the saturation vapor pressure of the exhaust gas.

At step 12, a temperature of a mixed gas before the mixed gas is processed by a supercharger and a compressor, and a pressure of the mixed gas before being processed by the supercharger and the compressor are obtained; a molar concentration of water molecules under a maximum humidity limit value of the mixed gas before such processing is calculated according to the temperature of the mixed gas before such processing, and the pressure of the mixed gas before such processing, and a preset maximum humidity limit value of the mixed gas before such processing.

In one embodiment, step 12 includes:

step 31, substituting the temperature of the mixed gas before being processed by the supercharger and the compressor into the formula $$P_{svpin} = 10^{\left[2.76 + \frac{7.502(T_{in} - 273.15)}{T_{in} - 35.85}\right]}, \quad (1)$$

calculating a saturation vapor pressure of the mixed gas before being processed by the supercharger and the compressor, where $P_{svpin}$ is the saturation vapor pressure of the mixed gas, and $T_{in}$ is the temperature of the mixed gas;

step 32, substituting the saturation vapor pressure of the mixed gas before being processed by the supercharger and the compressor, the pressure of the mixed gas before such processing, and the preset maximum humidity limit value of the mixed gas before such processing into a formula $$RH_{in} = [H_2O]_{in} \frac{P_{in}}{P_{svpin}}, \quad (2)$$

and calculating the molar concentration of water molecules of the exhaust gas processed by the EGR cooler under the maximum humidity limit value, where $RH_{in}$ is a humidity of the mixed gas, $[H_2O]_{in}$ is the molar concentration of water molecules, $P_{in}$ is the temperature of the mixed gas, and $P_{svpin}$ is the saturation vapor pressure of the mixed gas.

At step 13, an excess air coefficient is obtained, and a molar volume ratio of an air is calculated according to a relative volume of nitrogen to oxygen in the air, a relative volume of carbon dioxide relative to the oxygen in the air, a relative volume of water molecules relative to the oxygen in the air, and the excess air coefficient.

In one embodiment, step 13 includes:
obtaining the excess air coefficient $Z_{airFuel}$ by an oxygen sensor;
calculating the molar volume ratio of the air according to formula $$Z_{airFuel} = \frac{A(M_{O2} + xM_{N2} + yM_{CO2} + zM_{H2O})}{M_{CH_n}}; \quad (3)$$

where, A is the molar volume ratio of the air, x is the relative volume of the nitrogen to the oxygen in the air, y is the relative volume of the carbon dioxide relative to the oxygen in the air, z is the relative volume of the water molecules relative to the oxygen in the air, $M_{O2}$ is a relative molecular mass of the oxygen, $M_{N2}$ is a relative molecular mass of the nitrogen, $M_{CO2}$ is a relative molecular mass of the carbon dioxide, $M_{H2O}$ is a relative molecular mass of the water molecules, and $M_{CH_n}$ is a relative molecular mass of the gasoline.

In one embodiment, x, y, and z are all known and have preset fixed values.

At step 14, an allowable EGR rate of the exhaust gas processed by the EGR cooler under the maximum humidity limit value is calculated according to the molar concentration of the water molecules and the molar volume ratio of the air of the exhaust gas processed by the EGR cooler under the maximum humidity limit value; an allowable EGR rate of the mixed gas before being processed by the supercharger and the compressor under the maximum humidity limit value is calculated according to the molar concentration of the water molecules and the molar volume ratio of the air of the mixed gas before such processing under the maximum humidity limit value.

In one embodiment, the calculating of the allowable EGR rate of the exhaust gas processed by the EGR cooler under the maximum humidity limit value according to the molar concentration of the water molecules and the molar volume ratio of the air of the exhaust gas processed by the EGR cooler under the maximum humidity limit value includes:

by reference to a gasoline engine working in an equivalent mode or in an enriched mode, obtaining a statistical chemical equation of a gasoline combustion of the gasoline engine $CH_n + A[O_2 + xN_2 + yCO_2 + zH_2O] + B[aCO_2 + cH_2O + eO_2 + gCH_n + hN_2]$ (4), where n is a relative atomic ratio of hydrogen to carbon in gasoline, which is approximately equal to 1.87, A is the molar volume ratio of the air, B is molar volume ratio of an introduced exhaust gas, x is the relative volume of the nitrogen to the oxygen in the air, y is the relative volume of the carbon dioxide relative to the oxygen in the air, z is the relative volume of the water molecules relative to the oxygen in the air, a is the molar concentration of the carbon dioxide of the introduced exhaust gas, c is the molar concentration of the water molecules of the introduced exhaust gas, e is the molar concentration of the oxygen of the introduced exhaust gas, g is the molar concentration of hydrocarbons of the introduced exhaust gas, and h is the molar concentration of hydrocarbons of the introduced exhaust gas;

according to the formula (4), determining a system of equations $$\begin{cases} a1 = \frac{1+Ay}{1-B1} - g1 \\ c1 = \frac{\frac{n}{2}+Az}{1-B1} - \frac{ng1}{2} \\ g1 = \frac{1+\frac{n}{4}-A}{(1-B1)\cdot\left(1+\frac{n}{4}\right)} \\ h1 = \frac{Ax}{1-B1} \end{cases} \quad (5)$$

substituting the molar volume ratio of air into A of the system of equations, and substituting the molar concentration of the water molecules of a first introduced exhaust gas into c1, to calculate the molar concentration a1 of the carbon dioxide of a first introduced exhaust gas, the molar concentration e1 of the oxygen of the first introduced exhaust gas, the molar concentration g1 of the hydrocarbons of the first introduced exhaust gas, and the molar volume ratio B1 of the first introduced exhaust gas, where the exhaust gas processed by the EGR cooler under the maximum humidity limit value is the first introduced exhaust gas;

according to the molar volume ratio of air into A, the molar volume ratio B1 of the first introduced exhaust gas, the molar concentration a1 of the carbon dioxide of the first introduced exhaust gas, the molar concentration c1 of the water molecules of the first introduced exhaust gas, the molar concentration e1 of the oxygen of the first introduced exhaust gas, and the molar concentration g1 of the hydrocarbons of the first introduced exhaust gas, calculating the allowable EGR rate of the exhaust gas processed by the EGR cooler under the maximum humidity limit value according to formula $$Z_{egr}1 = \frac{B1(a1M_{CO2} + c1M_{H2O} + g1M_{CHn} + h1M_{N2})}{A(M_{O2} + xM_{N2} + yM_{CO2} + zM_{H2O}) + B1(a1M_{CO2} + c1M_{H2O} + g1M_{CHn} + h1M_{N2})}$$

(formula (6)), where, $Z_{egr}1$ is the allowable EGR rate of the exhaust gas processed by the EGR cooler under the maximum humidity limit value.

In one embodiment, at step 14, the calculating of the allowable EGR rate of the mixed gas before being processed by the supercharger and the compressor under the maximum humidity limit value according to the molar concentration of the water molecules and the molar volume ratio of the air of the mixed gas before such processing under the maximum humidity limit value includes:

by reference to the gasoline engine working in an equivalent mode or in an enriched mode, obtaining the statistical chemical equation of the gasoline combustion of the gasoline engine $CH_n+A[O_2+xN_2+yCO_2+zH_2O]+B[aCO_2+cH_2O+eO_2+gCH_n+hN_2]$ (4), where n is the relative atomic ratio of the hydrogen to the carbon in the gasoline, which is approximately equal to 1.87, A is the molar volume ratio of the air, B is the molar volume ratio of an introduced exhaust gas, x is the relative volume of the nitrogen to the oxygen in the air, y is the relative volume of the carbon dioxide relative to the oxygen in the air, z is the relative volume of the water molecules relative to the oxygen in the air, a is the molar concentration of the carbon dioxide of the introduced exhaust gas, c is the molar concentration of the water molecules of the introduced exhaust gas, e is the molar concentration of the oxygen of the introduced exhaust gas, g is the molar concentration of hydrocarbons of the introduced exhaust gas, and h is the molar concentration of the hydrocarbons of the introduced exhaust gas;

according to the formula (4), determining the system of equations $$\begin{cases} a2 = \dfrac{1+Ay}{1-B2} - g2 \\ c2 = \dfrac{\dfrac{n}{2}+Az}{1-B2} - \dfrac{ng2}{2} \\ g2 = \dfrac{1+\dfrac{n}{4}-A}{(1-B2)\cdot\left(1+\dfrac{n}{4}\right)} \\ h2 = \dfrac{Ax}{1-B2} \end{cases} \quad (7)$$

substituting the molar volume ratio of air into A of the system of equations, and substituting the molar concentration of the water molecules of a second introduced exhaust gas into c2, to calculate the molar concentration a2 of the carbon dioxide of the second introduced exhaust gas, the molar concentration e2 of the oxygen of the second introduced exhaust gas, the molar concentration g2 of the hydrocarbons of the second introduced exhaust gas, and the molar volume ratio B2 of the second introduced exhaust gas, where the mixed gas before being processed by the supercharger and the compressor under the maximum humidity limit value is the second introduced exhaust gas;

according to the molar volume ratio of air into A, the molar volume ratio B2 of the second introduced exhaust gas, the molar concentration a2 of the carbon dioxide of the second introduced exhaust gas, the molar concentration c2 of the water molecules of the second introduced exhaust gas, the molar concentration e2 of the oxygen of the second introduced exhaust gas, the molar concentration g2 of the hydrocarbons of the second introduced exhaust gas, calculating the allowable EGR rate of the mixed gas before being processed by the supercharger and the compressor under the maximum humidity limit value according to formula $$Z_{egr}2 = \dfrac{B2(a2M_{CO2} + c2M_{H2O} + g2M_{CHn} + h2M_{N2})}{A(M_{O2} + xM_{N2} + yM_{CO2} + zM_{H2O}) + B2(a2M_{CO2} + c2M_{H2O} + g2M_{CHn} + h2M_{N2})}$$

(formula (6)), where, $Z_{egr}2$ is the allowable EGR rate of the mixed gas before being processed by the supercharger and the compressor under the maximum humidity limit value.

In one embodiment, when calculating the allowable EGR rate of the mixed gas before being processed by the supercharger and the compressor under the maximum humidity limit value according to the molar concentration of the water molecules of the mixed gas before such processing under the maximum humidity limit value, it is necessary to convert the molar concentration of the water molecules of the mixed gas before such processing under the maximum humidity limit value to the molar concentration of water molecules of the exhaust gas processed by the EGR cooler under the maximum humidity limit value. A conversion of the molar concentration of the water molecules in a strict mathematical sense needs to add an equation before a solution can be found. Solving the equation cannot be done by linear algebra methods, the solution process is more complicated. When the solution is deployed on a controller, an operation of the controller is more complicated. A simple and reliable conversion method is an amplification method. The amplification method makes the molar concentration of the water molecules of the mixed gas before being processed by the supercharger and the compressor under the maximum humidity limit value equal to the molar concentration of the water molecules of the exhaust gas processed by the EGR cooler under the maximum humidity limit value.

At step 15, a smaller EGR rate is determined between the allowable EGR rate of the mixed gas before being processed by the supercharger and the compressor under the maximum humidity limit value, and the allowable EGR rate of the exhaust gas processed by the EGR cooler under the maximum humidity limit value is found, and the smaller EGR rate is taken as a maximum limit value of an EGR rate in actual working conditions.

In one embodiment, there are two condensation scenarios for the exhaust gas. A first is that the exhaust gas condenses after the exhaust gas is processed by the EGR cooler. A second is that LP-EGR introduces the exhaust gas into a rear intake system and mixes the exhaust gas with fresh air and makes a temperature state and a pressure state of gas changes, and that the gas condenses before being introduced into the supercharger and the compressor. For the first condensation situation, a calculated allowable EGR rate of the exhaust gas processed by the EGR cooler under the maximum humidity limit value is taken as a maximum limit value of an EGR rate in actual working conditions, which ensures that the exhaust gas processed by the EGR cooler does not condense. For the second condensation situation, in the same way, a calculated allowable EGR rate of the mixed gas before being processed by the supercharger and the compressor under the maximum humidity limit value is taken as maximum limit value of the EGR rate in actual working conditions, which also ensures that the mixed gas before being processed by the supercharger and the compressor does not condense. Therefore, the smaller EGR rate between the allowable EGR rate of the mixed gas before being processed by the supercharger and the compressor under the maximum humidity limit value, and the allowable EGR rate of the exhaust gas processed by the EGR cooler under the maximum humidity limit value, is taken as a maximum limit value of the EGR rate in actual working conditions, thus the EGR rate can be obtained without condensation entering into the supercharger and the compressor.

Figure 4:
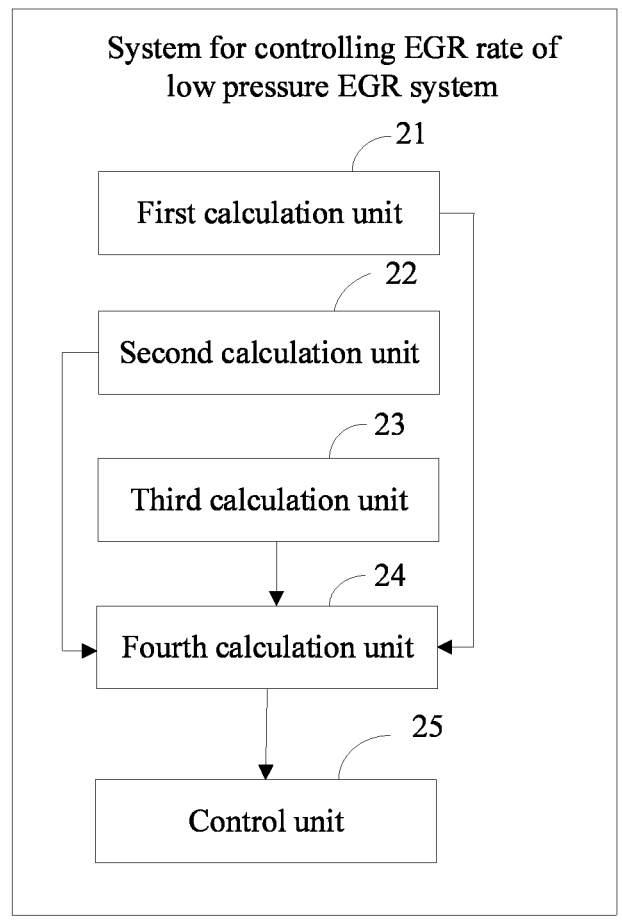
FIG. 4 is a structure diagram of one embodiment of a system for controlling EGR rates of a low pressure EGR system.

FIG. 4 illustrates a system for controlling EGR rate of a low pressure EGR system. The system for controlling EGR rate of low pressure EGR system includes: a first calculation unit 21, a second calculation unit 22, a third calculation unit 23, a fourth calculation unit 24, a control unit 25. In one embodiment, the first calculation unit 21, the second calculation unit 22, the third calculation unit 23, the fourth calculation unit 24, and the control unit 25 can be individual processors. For example, the first calculation unit 21 can be a first processor, the second calculation unit 22 can be a second processor, the third calculation unit 23 can be third processor, the fourth calculation unit 24 can be fourth processor, and the control unit 25 can be a fifth processor. In one embodiment, the first calculation unit 21, the second calculation unit 22, the third calculation unit 23, the fourth calculation unit 24, and the control unit 25 can be combined into one processor.

The first calculation unit 21 is used to obtain a temperature of exhaust gas processed by an EGR cooler and a pressure of the exhaust gas processed by the EGR cooler; calculate a molar concentration of water molecules of the exhaust gas processed by the EGR cooler under a maximum humidity limit value according to the temperature of exhaust gas processed by the EGR cooler, the pressure of the exhaust gas processed by the EGR cooler, and a preset maximum humidity limit value of the exhaust gas processed by the EGR cooler.

The second calculation unit 22 is used to obtain a temperature of a mixed gas before the mixed gas is processed by a supercharger and a compressor, and a pressure of the mixed gas before such processing is obtained; and to calculate a molar concentration of water molecules under a maximum humidity limit value of the mixed gas before being processed by the supercharger and the compressor according to the temperature of the mixed gas before such processing, and the pressure of the mixed gas before such processing, and a preset maximum humidity limit value of the mixed gas before being processed by the supercharger and the compressor.

The third calculation unit 23 is used to obtain an excess air coefficient; and calculate a molar volume ratio of an air according to a relative volume of nitrogen to oxygen in the air, a relative volume of carbon dioxide relative to the oxygen in the air, a relative volume of water molecules relative to the oxygen in the air, and the excess air coefficient.

The fourth calculation unit 24 is used to calculate an allowable EGR rate of the exhaust gas processed by the EGR cooler under the maximum humidity limit value according to the molar concentration of the water molecules and the molar volume ratio of the air of the exhaust gas processed by the EGR cooler under the maximum humidity limit value; calculate an allowable EGR rate of the mixed gas before being processed by the supercharger and the compressor under the maximum humidity limit value according to the molar concentration of the water molecules and the molar volume ratio of the air of the mixed gas before being processed by the supercharger and the compressor under the maximum humidity limit value.

The control unit 25 is used to determine a smaller EGR rate between the allowable EGR rate of the mixed gas before being processed by the supercharger and the compressor under the maximum humidity limit value, and the allowable EGR rate of the exhaust gas processed by the EGR cooler under the maximum humidity limit value; and take the smaller EGR rate as a maximum limit value of an EGR rate in actual working conditions.

In one embodiment, the first calculation unit 21 is further used to:

substitute the temperature of the exhaust gas processed by the EGR cooler into the formula $$P_{svpin} = 10^{\left[2.76 + \frac{7.502(T_{in}-273.15)}{T_{in}-35.85}\right]}, \quad (1)$$

and calculate a saturation vapor pressure of the exhaust gas processed by the EGR cooler, where $P_{svpin}$ is the saturation vapor pressure of the exhaust gas processed by the EGR cooler, and $T_{in}$ is the temperature of the exhaust gas processed by an EGR cooler;

substitute the saturation vapor pressure of the exhaust gas processed by the EGR cooler, the pressure of the exhaust gas processed by the EGR cooler, and the preset maximum humidity limit value of the exhaust gas processed the EGR cooler into a formula $$RH_{in} = [H_2O]_{in} \frac{P_{in}}{P_{svpin}}, \quad (2)$$

and calculate the molar concentration of water molecules of the exhaust gas processed by the EGR cooler under the maximum humidity limit value, where $RH_{in}$ is a humidity of the exhaust gas, $[H_2O]_{in}$ is the molar concentration of water molecules, $P_{in}$ is the temperature of the exhaust gas, and $P_{svpin}$ is the saturation vapor pressure of the exhaust gas.

In one embodiment, the second calculation unit 22 is further used to:

substitute the temperature of the mixed gas before being processed by the supercharger and the compressor into the formula $$P_{svpin} = 10^{\left[2.76 + \frac{7.502(T_{in}-273.15)}{T_{in}-3585}\right]}, \quad (1)$$

and calculate a saturation vapor pressure of the mixed gas before such processing, where $P_{svpin}$ is the saturation vapor pressure of the mixed gas, and $T_{in}$ is the temperature of the mixed gas;

substitute the saturation vapor pressure of the mixed gas before being processed by the supercharger and the compressor, the pressure of the mixed gas before such processing, and the preset maximum humidity limit value of the mixed gas before such processing into formula $$RH_{in} = [H_2O]_{in} \frac{P_{in}}{P_{svpin}}, \quad (2)$$

and calculate the molar concentration of water molecules of the exhaust gas processed by the EGR cooler under the maximum humidity limit value, where $RH_{in}$ is a humidity of the mixed gas, $[H_2O]_{in}$ is the molar concentration of water molecules, $P_{in}$ is the temperature of the mixed gas, and $P_{svpin}$ is the saturation vapor pressure of the mixed gas.

The present disclosure also relates to a vehicle, the vehicle includes the system for controlling EGR rate of low pressure EGR system.

In one embodiment, the first calculation unit 21 is further used to:

substitute the temperature of the exhaust gas processed by the EGR cooler into the formula $$P_{svpin} = 10^{\left[2.76 + \frac{7.502(T_{in} - 273.15)}{T_{in} - 35.85}\right]}, \quad (1)$$

and calculate a saturation vapor pressure of the exhaust gas processed by the EGR cooler, where $P_{svpin}$ is the saturation vapor pressure of the exhaust gas processed by the EGR cooler, and $T_{in}$ is the temperature of the exhaust gas processed by an EGR cooler;

substitute the saturation vapor pressure of the exhaust gas processed by the EGR cooler, the pressure of the exhaust gas processed by the EGR cooler, and the preset maximum humidity limit value of the exhaust gas processed the EGR cooler into a formula $$RH_{in} = [H_2O]_{in} \frac{P_{in}}{P_{svpin}}, \quad (2)$$

and calculate the molar concentration of water molecules of the exhaust gas processed by the EGR cooler under the maximum humidity limit value, where $RH_{in}$ is a humidity of the exhaust gas, $[H_2O]_{in}$ is the molar concentration of water molecules, $P_{in}$ is the temperature of the exhaust gas, and $P_{svpin}$ is the saturation vapor pressure of the exhaust gas.

In one embodiment, the second calculation unit 22 is further used to:

substitute the temperature of the mixed gas before being processed by the supercharger and the compressor into the formula $$P_{svpin} = 10^{\left[2.76 + \frac{7.502(T_{in} - 273.15)}{T_{in} - 35.85}\right]}, \quad (1)$$

and calculate a saturation vapor pressure of the mixed gas before such processing, where $P_{svpin}$ is the saturation vapor pressure of the mixed gas, and $T_{in}$ is the temperature of the mixed gas;

substitute the saturation vapor pressure of the mixed gas before being processed by the supercharger and the compressor, the pressure of the mixed gas before such processing, and the preset maximum humidity limit value of the mixed gas before such processing into formula $$RH_{in} = [H_2O]_{in} \frac{P_{in}}{P_{svpin}}, \quad (2)$$

and calculate the molar concentration of water molecules of the exhaust gas processed by the EGR cooler under the maximum humidity limit value, where $RH_{in}$ is a humidity of the mixed gas, $[H_2O]_{in}$ is the molar concentration of water molecules, $P_{in}$ is the temperature of the mixed gas, and $P_{svpin}$ is the saturation vapor pressure of the mixed gas.

Figure 5:
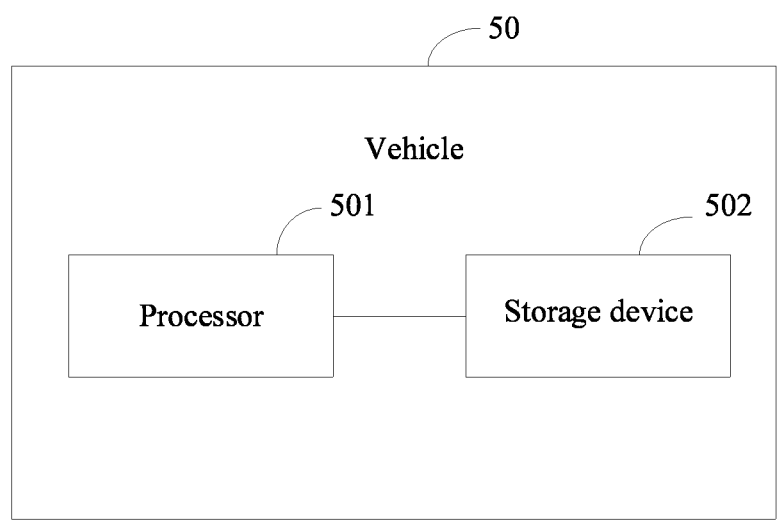
FIG. 5 is a block diagram of a vehicle.

FIG. 5 is a block diagram of the vehicle 50 implementing the method for controlling EGR rate of low pressure EGR system in one embodiment of the present disclosure. The vehicle 50 includes an in-vehicle device. The vehicle 50 or the device may include at least one processor 501 and a storage device 502. The at least one processor 501 is used to execute computer programs, such as an operating system and a system implementing the method for controlling EGR rate of low pressure EGR system, as installed in the vehicle 50. The storage device 502 stores computer-readable instructions of the computer programs. The storage device 502 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium.

The present disclosure has following beneficial effects.

The present disclosure calculates step by step the allowable EGR rate of the mixed gas before being processed by the supercharger and the compressor under the maximum humidity limit value, and the allowable EGR rate of the exhaust gas processed by the EGR cooler under the maximum humidity limit value; determines a smaller EGR rate between the two allowable EGR rates, ensures that the exhaust gas processed by the EGR cooler does not include condensation, and ensures that the mixed gas before being processed by the supercharger and the compressor does not include condensation without adding a humidity sensor, therefore solving a problem that under certain working conditions, if the exhaust gas condenses when the exhaust gas is introduced into the intake system, impeller damage to the compressor in the supercharger is likely to occur and the reliability and life of the engine components are likely to be reduced.

Those skilled in the art should understand that the above description and the embodiments of the present disclosure shown in the drawings are only examples and do not limit the present disclosure. The function and structure and principles of the present disclosure have been shown and explained in the embodiments. Without departing from the principles, the implementation of the present disclosure may have any deviation or modification.

What is claimed is:

1. A method for controlling Exhaust Gas Recirculation (EGR) rate of a low pressure EGR system, the method comprising:

step 11, obtaining a temperature of exhaust gas processed by an EGR cooler and a pressure of the exhaust gas processed by the EGR cooler; calculating a molar concentration of water molecules of the exhaust gas processed by the EGR cooler under a maximum humidity limit value of the exhaust gas, the molar concentration of water molecules being calculated based on the temperature of exhaust gas processed by the EGR cooler, the pressure of the exhaust gas processed by the EGR cooler, a preset maximum humidity limit value of the exhaust gas processed by the EGR cooler;

step 12, obtaining a temperature of a mixed gas before the mixed gas is processed by a supercharger and a compressor, and a pressure of the mixed gas before the mixed gas is processed by the supercharger and the compressor; calculating a molar concentration of water molecules under a maximum humidity limit value of the mixed gas before the mixed gas is processed by the supercharger and the compressor, the maximum humidity being calculated based on the temperature of the mixed gas before being processed by the supercharger and the compressor, and the pressure of the mixed gas before being processed by the supercharger and the compressor, a preset maximum humidity limit value of the mixed gas before being processed by the supercharger and the compressor;

step 13, obtaining an excess air coefficient, and calculating a molar volume ratio of air according to a relative volume of nitrogen to oxygen in the air, a relative volume of carbon dioxide relative to the oxygen in the air, a relative volume of water molecules relative to the oxygen in the air, and the excess air coefficient;

step 14, calculating an allowable EGR rate of the exhaust gas processed by the EGR cooler under the maximum humidity limit value of the exhaust gas, according to the molar concentration of the water molecules and the molar volume ratio of the air of the exhaust gas processed by the EGR cooler under the maximum humidity limit value of the exhaust gas;

calculating an allowable EGR rate of the mixed gas before the mixed gas is processed the supercharger and the compressor under the maximum humidity limit value of the mixed gas, according to the molar concentration of the water molecules and the molar volume ratio of the air of the mixed gas before the mixed gas is processed by the supercharger and the compressor under the maximum humidity limit value of the mixed gas;

step 15, determining a smaller EGR rate between the allowable EGR rate of the mixed gas before being processed by the supercharger and the compressor under the maximum humidity limit value of the exhaust gas, and the allowable EGR rate of the exhaust gas processed by the EGR cooler under the maximum humidity limit value of the mixed gas; and taking the smaller EGR rate as a maximum limit value of an EGR rate in actual working conditions.

2. The method as recited in claim 1, wherein step 11 further comprises:

step 21, substituting the temperature of the exhaust gas processed by the EGR cooler into a following formula $$P_{svpin} = 10^{\left[2.76 + \frac{7.502(T_{in} - 273.15)}{T_{in} - 35.85}\right]}, \quad (1)$$

and calculating a saturation vapor pressure of the exhaust gas processed by the EGR cooler, wherein $P_{svpin}$ is the saturation vapor pressure of the exhaust gas processed by the EGR cooler, $T_{in}$ is the temperature of the exhaust gas processed by the EGR cooler;

step 22, substituting the saturation vapor pressure of the exhaust gas processed by the EGR cooler, the pressure of the exhaust gas processed by the EGR cooler, and the preset maximum humidity limit value of the exhaust gas processed the EGR cooler into a following formula $$RH_{in} = [H_2O]_{in} \frac{P_{in}}{P_{svpin}}, \quad (2)$$

and calculating the molar concentration of water molecules of the exhaust gas processed by the EGR cooler under the maximum humidity limit value of the exhaust gas, wherein $RH_{in}$ is a humidity of the exhaust gas, $[H_2O]_{in}$ is the molar concentration of water molecules, $P_{in}$ is the temperature of the exhaust gas, $P_{svpin}$ is the saturation vapor pressure of the exhaust gas.

3. The method as recited in claim 1, wherein step 12 further comprises:

step 31, substituting the temperature of the mixed gas before being processed by the supercharger and the compressor into a following formula $$P_{svpin} = 10^{\left[2.76 + \frac{7.502(T_{in} - 273.15)}{T_{in} - 35.85}\right]}, \quad (1)$$

and calculating a saturation vapor pressure of the mixed gas before being processed by the supercharger and the compressor, wherein $P_{svpin}$ is the saturation vapor pressure of the mixed gas, $T_{in}$ is the temperature of the mixed gas;

step 32, substituting the saturation vapor pressure of the mixed gas before being processed by the supercharger and the compressor, the pressure of the mixed gas before being processed by the supercharger and the compressor, and the preset maximum humidity limit value of the mixed gas before being processed by the supercharger and the compressor into a following formula $$RH_{in} = [H_2O]_{in} \frac{P_{in}}{P_{svpin}}, \quad (2)$$

and calculating the molar concentration of water molecules of the exhaust gas processed by the EGR cooler under the maximum humidity limit value of the mixed gas, wherein $RH_{in}$ is a humidity of the mixed gas, $[H_2O]_{in}$ is the molar concentration of water molecules, $P_{in}$ is the temperature of the mixed gas, $P_{svpin}$ is the saturation vapor pressure of the mixed gas.

4. The method as recited in claim 1, wherein step 13 further comprises:

obtaining an excess air coefficient $Z_{airFuel}$ by an oxygen sensor;

calculating the molar volume ratio of the air according to a following formula $$Z_{airFuel} = \frac{A(M_{O2} + xM_{N2} + yM_{CO2} + zM_{H2O})}{M_{CH_n}}; \quad (3)$$

wherein, A is the molar volume ratio of the air, x is the relative volume of the nitrogen to the oxygen in the air, y is the relative volume of the carbon dioxide relative to the oxygen in the air, z is the relative volume of the water molecules relative to the oxygen in the air, $M_{O2}$ is a relative molecular mass of the oxygen, $M_{N2}$ is a relative molecular mass of the nitrogen, $M_{CO2}$ is a relative molecular mass of the carbon dioxide, $M_{H2O}$ is a relative molecular mass of the water molecules, $M_{CH_n}$ is a relative molecular mass of the gasoline.

5. The method as recited in claim 1, wherein calculating the allowable EGR rate of the exhaust gas processed by the EGR cooler under the maximum humidity limit value of the exhaust gas, according to the molar concentration of the water molecules and the molar volume ratio of the air of the exhaust gas processed by the EGR cooler under the maximum humidity limit value of the exhaust gas, further comprises:

according to an gasoline engine working in an equivalent mode or an enriched mode, obtaining a statistical chemical equation of a gasoline combustion of the gasoline engine $CH_n + A[O_2 + xN_2 + yCO_2 + zH_2O] + B[aCO_2 + cH_2O + eO_2 + gCH_n + hN_2]$ (4), wherein n is a relative atomic ratio of hydrogen to carbon in gasoline, which is approximately equal to 1.87, A is the molar volume ratio of the air, B is molar volume ratio of an introduced exhaust gas, x is the relative volume of the nitrogen to the oxygen in the air, y is the relative volume of the carbon dioxide relative to the oxygen in the air, z is the relative volume of the water molecules relative to the oxygen in the air, a is the molar concentration of the carbon dioxide of the introduced exhaust gas, c is the molar concentration of the water molecules of the introduced exhaust gas, e is the molar concentration of the oxygen of the introduced exhaust gas, g is the molar concentration of hydrocarbons of the introduced exhaust gas, h is the molar concentration of hydrocarbons of the introduced exhaust gas;

according to the statistical chemical equation, determining a system of equations $$\begin{cases} a1 = \dfrac{1+Ay}{1-B1} - g1 \\ c1 = \dfrac{\frac{n}{2} + Az}{1-B1} - \dfrac{ng1}{2} \\ g1 = \dfrac{1 + \frac{n}{4} - A}{(1-B1)\cdot\left(1 + \frac{n}{4}\right)} \\ h1 = \dfrac{Ax}{1-B1} \end{cases} \quad (5)$$

substituting the molar volume ratio of air into A of the system of equations, and substituting the molar concentration of the water molecules of a first introduced exhaust gas into c1, to calculate the molar concentration a1 of the carbon dioxide of a first introduced exhaust gas, the molar concentration e1 of the oxygen of the first introduced exhaust gas, the molar concentration g1 of the hydrocarbons of the first introduced exhaust gas, and the molar volume ratio B1 of the first introduced exhaust gas, wherein the exhaust gas processed by the EGR cooler under the maximum humidity limit value of the exhaust gas is the first introduced exhaust gas;

according to the molar volume ratio of air into A, the molar volume ratio B1 of the first introduced exhaust gas, the molar concentration a1 of the carbon dioxide of the first introduced exhaust gas, the molar concentration c1 of the water molecules of the first introduced exhaust gas, the molar concentration e1 of the oxygen of the first introduced exhaust gas, the molar concentration g1 of the hydrocarbons of the first introduced exhaust gas, calculating the allowable EGR rate of the exhaust gas processed by the EGR cooler under the maximum humidity limit value of the exhaust gas according to a $$Z_{egr}1 = \dfrac{B1(a1M_{CO2} + c1M_{H2O} + g1M_{CHn} + h1M_{N2})}{A(M_{O2} + xM_{N2} + yM_{CO2} + zM_{H2O}) + B1(a1M_{CO2} + c1M_{H2O} + g1M_{CHn} + h1M_{N2})}$$

formula (6), wherein $Z_{egr}1$ is the allowable EGR rate of the exhaust gas processed by the EGR cooler under the maximum humidity limit value of the exhaust gas.

6. The method as recited in claim 5, wherein calculating the allowable EGR rate of the mixed gas before being processed by the supercharger and the compressor under the maximum humidity limit value of the mixed gas, according to the molar concentration of the water molecules and the molar volume ratio of the air of the mixed gas before the mixed gas being processed by the supercharger and the compressor under the maximum humidity limit value of the mixed gas, further comprises:

according to the gasoline engine working in an equivalent mode or an enriched mode, obtaining the statistical chemical equation of the gasoline combustion of the gasoline engine $CH_n + A[O_2 + xN_2 + yCO_2 + zH_2O] + B[aCO_2 + cH_2O + eO_2 + gCH_n + hN_2]$ (4), wherein n is the relative atomic ratio of the hydrogen to the carbon in the gasoline, which is approximately equal to 1.87, A is the molar volume ratio of the air, B is the molar volume ratio of an introduced exhaust gas, x is the relative volume of the nitrogen to the oxygen in the air, y is the relative volume of the carbon dioxide relative to the oxygen in the air, z is the relative volume of the water molecules relative to the oxygen in the air, a is the molar concentration of the carbon dioxide of the introduced exhaust gas, c is the molar concentration of the water molecules of the introduced exhaust gas, e is the molar concentration of the oxygen of the introduced exhaust gas, g is the molar concentration of hydrocarbons of the introduced exhaust gas, h is the molar concentration of the hydrocarbons of the introduced exhaust gas;

according to the formula (4), determining the system of equations $$\begin{cases} a2 = \dfrac{1+Ay}{1-B2} - g2 \\ c2 = \dfrac{\frac{n}{2} + Az}{1-B2} - \dfrac{ng2}{2} \\ g2 = \dfrac{1 + \frac{n}{4} - A}{(1-B2)\cdot\left(1 + \frac{n}{4}\right)} \\ h2 = \dfrac{Ax}{1-B2} \end{cases} \quad (7)$$

substituting the molar volume ratio of air into A of the system of equations, and substituting the molar concentration of the water molecules of a second introduced exhaust gas into c2, to calculate the molar concentration a2 of the carbon dioxide of the second introduced exhaust gas, the molar concentration e2 of the oxygen of the second introduced exhaust gas, the molar concentration g2 of the hydrocarbons of the second introduced exhaust gas, and the molar volume ratio B2 of the second introduced exhaust gas, where the mixed gas before being processed by the supercharger and the compressor under the maximum humidity limit value of the mixed gas is the second introduced exhaust gas;

according to the molar volume ratio of air into A, the molar volume ratio B2 of the second introduced exhaust gas, the molar concentration a2 of the carbon dioxide of the second introduced exhaust gas, the molar concentration c2 of the water molecules of the second introduced exhaust gas, the molar concentration e2 of the oxygen of the second introduced exhaust gas, the molar concentration g2 of the hydrocarbons of the second introduced exhaust gas, calculating the allowable EGR rate of the mixed gas before the mixed gas is processed by the supercharger and the compressor under the maximum humidity limit value of the mixed gas according to a $$Z_{egr}2 = \frac{B2(a2M_{CO2} + c2M_{H2O} + g2M_{CHn} + h2M_{N2})}{A(M_{O2} + xM_{N2} + yM_{CO2} + zM_{H2O}) + B2(a2M_{CO2} + c2M_{H2O} + g2M_{CHn} + h2M_{N2})}$$

formula (6), wherein $Z_{egr}2$ is the allowable EGR rate of the mixed gas before being processed by the supercharger and the compressor under the maximum humidity limit value of the mixed gas.

7. A system for controlling Exhaust Gas Recirculation (EGR) rate of low pressure EGR system, wherein the system comprises:
a first calculation unit, configured to obtain a temperature of exhaust gas processed by an EGR cooler and a pressure of the exhaust gas processed by the EGR cooler; calculate a molar concentration of water molecules of the exhaust gas processed by the EGR cooler under a maximum humidity limit value of the exhaust gas, the molar concentration of water molecules being calculated based on the temperature of exhaust gas processed by the EGR cooler, the pressure of the exhaust gas processed by the EGR cooler, a preset maximum humidity limit value of the exhaust gas processed by the EGR cooler;
a second calculation unit configured to obtain a temperature of a mixed gas before the mixed gas is processed by a supercharger and a compressor, and a pressure of the mixed gas before the mixed gas is processed by the supercharger and the compressor; calculate a molar concentration of water molecules under a maximum humidity limit value of the mixed gas before the mixed gas is processed by the supercharger and the compressor, the maximum humidity being calculated based on the temperature of the mixed gas before being processed by the supercharger and the compressor, and the pressure of the mixed gas before being processed by the supercharger and the compressor, a preset maximum humidity limit value of the mixed gas before being processed by the supercharger and the compressor;
a third calculation unit, configured to obtain an excess air coefficient, and calculate a molar volume ratio of air according to a relative volume of nitrogen to oxygen in the air, a relative volume of carbon dioxide relative to the oxygen in the air, a relative volume of water molecules relative to the oxygen in the air, and the excess air coefficient;
a fourth calculation unit, configured to calculate an allowable EGR rate of the exhaust gas processed by the EGR cooler under the maximum humidity limit value of the exhaust gas, according to the molar concentration of the water molecules and the molar volume ratio of the air of the exhaust gas processed by the EGR cooler under the maximum humidity limit value of the exhaust gas; calculate an allowable EGR rate of the mixed gas before the mixed gas is processed by the supercharger and the compressor under the maximum humidity limit value of the mixed gas, according to the molar concentration of the water molecules and the molar volume ratio of the air of the mixed gas before the mixed gas is processed by the supercharger and the compressor under the maximum humidity limit value of the mixed gas;
a control unit configured to determine a smaller EGR rate between the allowable EGR rate of the mixed gas before being processed by the supercharger and the compressor under the maximum humidity limit value of the exhaust gas, and the allowable EGR rate of the exhaust gas processed by the EGR cooler under the maximum humidity limit value of the mixed gas; and take the smaller EGR rate as a maximum limit value of an EGR rate in actual working conditions.

8. The system as recited in claim 7, wherein the first calculation unit further:
substitutes the temperature of the exhaust gas processed by the EGR cooler into a formula $$P_{svpin} = 10^{\left[2.76 + \frac{7.502(T_{in} - 273.15)}{T_{in} - 35.85}\right]}; \qquad (1)$$

and calculates a saturation vapor pressure of the exhaust gas processed by the EGR cooler, wherein $P_{svpin}$ is the saturation vapor pressure of the exhaust gas processed by the EGR cooler, $T_{in}$ is the temperature of the exhaust gas processed by an EGR cooler;
substitutes the saturation vapor pressure of the exhaust gas processed by the EGR cooler, the pressure of the exhaust gas processed by the EGR cooler, and the preset maximum humidity limit value of the exhaust gas processed the EGR cooler into a following formula $$RH_{in} = [H_2O]_{in} \frac{P_{in}}{P_{svpin}}; \qquad (2)$$

und calculates the molar concentration of water molecules of the exhaust gas processed by the EGR cooler under the maximum humidity limit value of the exhaust gas, wherein $RH_{in}$ is a humidity of the exhaust gas, $[H_2O]_{in}$ is the molar concentration of water molecules, $P_{in}$ is the temperature of the exhaust gas, $P_{svpin}$ is the saturation vapor pressure of the exhaust gas.

9. The system as recited in claim 7, wherein the second calculation unit further:
substitutes the temperature of the mixed gas before being processed by the supercharger and the into compressor a following formula $$P_{svpin} = 10^{\left[2.76 + \frac{7.502(T_{in} - 273.15)}{T_{in} - 35.85}\right]}; \qquad (1)$$

and calculates a saturation vapor pressure of the mixed gas before being processed by the supercharger and the compressor, wherein $P_{svpin}$ is the saturation vapor pressure of the mixed gas, $T_{in}$ is the temperature of the mixed gas;

substitutes the saturation vapor pressure of the mixed gas before being processed by the supercharger and the compressor, the pressure of the mixed gas before being processed by the supercharger and the compressor, and the preset maximum humidity limit value of the mixed gas before being processed by the supercharger and the compressor into a following formula $$RH_{in} = [H_2O]_{in} \frac{P_{in}}{P_{svpin}}; \qquad (2)$$

and calculates the molar concentration of water molecules of the exhaust gas processed by the EGR cooler under the maximum humidity limit value of the mixed gas, wherein $RH_{in}$ is a humidity of the mixed gas, $[H_2O]_{in}$ is the molar concentration of water molecules, $P_{in}$ is the temperature of the mixed gas, $P_{svpin}$ is the saturation vapor P pressure of the mixed gas.

10. The system as recited in claim 7, wherein the third calculation unit further:

obtains an excess air coefficient $Z_{airFuel}$ by an oxygen sensor;

calculates the molar volume ratio of the air according to a following formula $$Z_{airFuel} = \frac{A(M_{O2} + xM_{N2} + yM_{CO2} + zM_{H2O})}{M_{CH_n}}; \qquad (3)$$

wherein, A is the molar volume ratio of the air, x is the relative volume of the nitrogen to the oxygen in the air, y is the relative volume of the carbon dioxide relative to the oxygen in the air, z is the relative volume of the water molecules relative to the oxygen in the air, $M_{O2}$ is a relative molecular mass of the oxygen, $M_{N2}$ is a relative molecular mass of the nitrogen, $M_{CO2}$ is a relative molecular mass of the carbon dioxide, $M_{H2O}$ is a relative molecular mass of the water molecules, $M_{CH_n}$ is a relative molecular mass of the gasoline.

11. The system as recited in claim 7, wherein the fourth calculation unit further:

according to an gasoline engine working in an equivalent mode or an enriched mode, obtains a statistical chemical equation of a gasoline combustion of the gasoline $CH_n+A[O_2+xN_2+yCO_2+zH_2O]+B[aCO_2+cH_2O+eO_2+gCH_n+hN_2]$ engine (4), wherein $n_{is}$ a relative atomic ratio of hydrogen to carbon in gasoline, which is approximately equal to 1.87, A is the molar volume ratio of the air, B is molar volume ratio of an introduced exhaust gas, x is the relative volume of the nitrogen to the oxygen in the air, y is the relative volume of the carbon dioxide relative to the oxygen in the air, z is the relative volume of the water molecules relative to the oxygen in the air, a is the molar concentration of the carbon dioxide of the introduced exhaust gas, c is the molar concentration of the water molecules of the introduced exhaust gas, e is the molar concentration of the oxygen of the introduced exhaust gas, g is the molar concentration of hydrocarbons of the introduced exhaust gas, h is the molar concentration of hydrocarbons of the introduced exhaust gas;

according to the statistical chemical equation, determines a system of equations $$\begin{cases} a1 = \frac{1+Ay}{1-B1} - g1 \\ c1 = \frac{\frac{n}{2}+Az}{1-B1} - \frac{ng1}{2} \\ g1 = \frac{1+\frac{n}{4}-A}{(1-B1)\cdot\left(1+\frac{n}{4}\right)} \\ h1 = \frac{Ax}{1-B1} \end{cases} ; \qquad (5)$$

substitutes the molar volume ratio of air into A of the system of equations, and substituting the molar concentration of the water molecules of a first introduced exhaust gas into c1, to calculate the molar concentration a1 of the carbon dioxide of a first introduced exhaust gas, the molar concentration e1 of the oxygen of the first introduced exhaust gas, the molar concentration g1 of the hydrocarbons of the first introduced exhaust gas, and the molar volume ratio B1 of the first introduced exhaust gas, where the exhaust gas processed by the EGR cooler under the maximum humidity limit value of the exhaust gas is the first introduced exhaust gas;

according to the molar volume ratio of air into A, the molar volume ratio B1 of the first introduced exhaust gas, the molar concentration a1 of the carbon dioxide of the first introduced exhaust gas, the molar concentration c1 of the water molecules of the first introduced exhaust gas, the molar concentration e1 of the oxygen of the first introduced exhaust gas, the molar concentration g1 of the hydrocarbons of the first introduced exhaust gas, calculates the allowable EGR rate of the exhaust gas processed by the EGR cooler under the maximum humidity limit value of the exhaust gas according to a $$Z_{egr}1 = \frac{B1(a1M_{CO2}+c1M_{H2O}+g1M_{CH_n}+h1M_{N2})}{A(M_{O2}+xM_{N2}+yM_{CO2}+zM_{H2O})+ \\ B1(a1M_{CO2}+c1M_{H2O}+g1M_{CH_n}+h1M_{N2})}$$

formula (6), wherein $Z_{egr}1$ is the allowable EGR rate of the exhaust gas processed by the EGR cooler under the maximum humidity limit value of the exhaust gas.

12. The system as recited in claim 7, wherein the fourth calculation unit further:

according to the gasoline engine working in an equivalent mode or an enriched mode, obtains a statistical chemical equation of the gasoline combustion of the gasoline engine $CH_n+A[O_2+xN_2+yCO_2+zH_2O]+B[aCO_2+cH_2O+eO_2+gCH_n+hN_2]$ (4), wherein $n_{is}$ the relative atomic ratio of the hydrogen to the carbon in the gasoline, which is approximately equal to 1.87, A is the molar volume ratio of the air, B is the molar volume ratio of an introduced exhaust gas, x is the relative volume of the nitrogen to the oxygen in the air, y is the relative volume of the carbon dioxide relative to the oxygen in the air, z is the relative volume of the water molecules relative to the oxygen in the air, a is the molar concentration of the carbon dioxide of the introduced exhaust gas, c is the molar concentration of the water molecules of the introduced exhaust gas, e is the molar concentration of the oxygen of the introduced exhaust gas, g is the molar concentration of hydrocarbons of the introduced exhaust gas, h is the molar concentration of the hydrocarbons of the introduced exhaust gas;

according to the statistical chemical equation, determines the system of equations $$\begin{cases} a2 = \dfrac{1+Ay}{1-B2} - g2 \\ c2 = \dfrac{\dfrac{n}{2}+Az}{1-B2} - \dfrac{ng2}{2} \\ g2 = \dfrac{1+\dfrac{n}{4}-A}{(1-B2)\cdot\left(1+\dfrac{n}{4}\right)} \\ h2 = \dfrac{Ax}{1-B2} \end{cases} \quad (7)$$

substitutes the molar volume ratio of air into A of the system of equations, and substitute the molar concentration of the water molecules of a second introduced exhaust gas into c2, to calculate the molar concentration a2 of the carbon dioxide of the second introduced exhaust gas, the molar concentration e2 of the oxygen of the second introduced exhaust gas, the molar concentration g2 of the hydrocarbons of the second introduced exhaust gas, and the molar volume ratio B2 of the second introduced exhaust gas, wherein the mixed gas before being processed by the supercharger and the compressor under the maximum humidity limit value of the mixed gas is the second introduced exhaust gas;

according to the molar volume ratio of air into A, the molar volume ratio B2 of the second introduced exhaust gas, the molar concentration a2 of the carbon dioxide of the second introduced exhaust gas, the molar concentration c2 of the water molecules of the second introduced exhaust gas, the molar concentration e2 of the oxygen of the second introduced exhaust gas, the molar concentration g2 of the hydrocarbons of the second introduced exhaust gas, calculates the allowable EGR rate of the mixed gas before the mixed gas is processed by the supercharger and the compressor under the maximum humidity limit value of the mixed gas according to a $$Z_{egr}2 = \dfrac{B2(a2M_{CO2}+c2M_{H2O}+g2M_{CHn}+h2M_{N2})}{A(M_{O2}+xM_{N2}+yM_{CO2}+zM_{H2O})+B2(a2M_{CO2}+c2M_{H2O}+g2M_{CHn}+h2M_{N2})}$$

formula (6), wherein, $Z_{egr}2$ is the allowable EGR rate of the mixed gas before being processed by the supercharger and the compressor under the maximum humidity limit value of the mixed gas.

13. A vehicle comprising:
at least one processor; and
a storage device storing a plurality of instructions, which when executed by the processor, causes the at least one processor to:
obtain a temperature of exhaust gas processed by an EGR cooler and a pressure of the exhaust gas processed by the EGR cooler; calculate a molar concentration of water molecules of the exhaust gas processed by the EGR cooler under a maximum humidity limit value of the exhaust gas, the molar concentration of water molecules being calculated based on the temperature of exhaust gas processed by the EGR cooler, the pressure of the exhaust gas processed by the EGR cooler, a preset maximum humidity limit value of the exhaust gas processed by the EGR cooler;

obtain a temperature of a mixed gas before the mixed gas is processed by a supercharger and a compressor, and a pressure of the mixed gas before the mixed gas is processed by the supercharger and the compressor; calculate a molar concentration of water molecules under a maximum humidity limit value of the mixed gas before the mixed gas is processed by the supercharger and the compressor, the maximum humidity being calculated based on the temperature of the mixed gas before being processed by the supercharger and the compressor, and the pressure of the mixed gas before being processed by the supercharger and the compressor, a preset maximum humidity limit value of the mixed gas before being processed by the supercharger and the compressor;

obtain an excess air coefficient, and calculate a molar volume ratio of air according to a relative volume of nitrogen to oxygen in the air, a relative volume of carbon dioxide relative to the oxygen in the air, a relative volume of water molecules relative to the oxygen in the air, and the excess air coefficient;

calculate an allowable EGR rate of the exhaust gas processed by the EGR cooler under the maximum humidity limit value of the exhaust gas, according to the molar concentration of the water molecules and the molar volume ratio of the air of the exhaust gas processed by the EGR cooler under the maximum humidity limit value of the exhaust gas;

calculate an allowable EGR rate of the mixed gas before the mixed gas is processed by the supercharger and the compressor under the maximum humidity limit value of the mixed gas, according to the molar concentration of the water molecules and the molar volume ratio of the air of the mixed gas before being processed by the supercharger and the compressor under the maximum humidity limit value of the mixed gas;

determine a smaller EGR rate between the allowable EGR rate of the mixed gas before being processed by the supercharger and the compressor under the maximum humidity limit value of the exhaust gas, and the allowable EGR rate of the exhaust gas processed by the EGR cooler under the maximum humidity limit value of the mixed gas; and take the smaller EGR rate as a maximum limit value of an EGR rate in actual working conditions.

14. The vehicle as recited in claim 13, wherein the at least one processor further:
substitutes the temperature of the exhaust gas processed by the EGR cooler into a following formula $$P_{svpin} = 10^{\left[2.76+\dfrac{7.502(T_{in}-273.15)}{T_{in}-35.85}\right]}; \quad (1)$$

and calculates a saturation vapor pressure of the exhaust gas processed by the EGR cooler, wherein $P_{svpin}$ is the saturation vapor pressure of the exhaust gas processed by the EGR cooler, $T_{in}$ is the temperature of the exhaust gas processed by an EGR cooler;

substitutes the saturation vapor pressure of the exhaust gas processed by the EGR cooler, the pressure of the exhaust gas processed by the EGR cooler, and the preset maximum humidity limit value of the exhaust gas processed the EGR cooler into a following formula $$RH_{in} = [H_2O]_{in} \frac{P_{in}}{P_{svpin}}; \quad (2)$$

and calculates the molar concentration of water molecules of the exhaust gas processed by the EGR cooler under the maximum humidity limit value of the exhaust gas, wherein $RH_{in}$ is a humidity of the exhaust gas, $[H_2O]_{in}$ is the molar concentration of water molecules, $P_{in}$ is the temperature of the exhaust gas, $P_{svpin}$ is the saturation vapor pressure of the exhaust gas.

15. The vehicle as recited in claim 13, wherein the at least one processor further:

substitutes the temperature of the mixed gas before being processed by the supercharger and the compressor into a following formula $$P_{svpin} = 10^{\left[2.76 + \frac{7.502(T_{in} - 273.15)}{T_{in} - 35.85}\right]}; \quad (1)$$

and calculates a saturation vapor pressure of the mixed gas before being processed by the supercharger and the compressor, wherein $P_{svpin}$ is the saturation vapor pressure of the mixed gas, $T_{in}$ is the temperature of the mixed gas;

substitutes the saturation vapor pressure of the mixed gas before being processed by the supercharger and the compressor, the pressure of the mixed gas before being processed by the supercharger and the compressor, and the preset maximum humidity limit value of the mixed gas before being processed by the supercharger and the compressor into a following formula $$RH_{in} = [H_2O]_{in} \frac{P_{in}}{P_{svpin}}; \quad (2)$$

and calculates the molar concentration of water molecules of the exhaust gas processed by the EGR cooler under the maximum humidity limit value of the mixed gas, wherein $RH_{in}$ is a humidity of the mixed gas, $[H_2O]_{in}$ is the molar concentration of water molecules, $P_{in}$ is the temperature of the mixed gas, $P_{svpin}$ is the saturation vapor pressure of the mixed gas.

16. The vehicle as recited in claim 13, wherein the at least one processor further:

obtains the excess air coefficient $Z_{airFuel}$ by an oxygen sensor;

calculates the molar volume ratio of the air according to a following formula $$Z_{airFuel} = \frac{A(M_{O2} + xM_{N2} + yM_{CO2} + zM_{H2O})}{M_{CH_n}}; \quad (3)$$

wherein, A is the molar volume ratio of the air, x is the relative volume of the nitrogen to the oxygen in the air, y is the relative volume of the carbon dioxide relative to the oxygen in the air, z is the relative volume of the water molecules relative to the oxygen in the air, $M_{O2}$ is a relative molecular mass of the oxygen, $M_{N2}$ is a relative molecular mass of the nitrogen, $M_{CO2}$ is a relative molecular mass of the carbon dioxide, $M_{H2O}$ is a relative molecular mass of the water molecules, $M_{CH_n}$ is a relative molecular mass of the gasoline.

17. The vehicle as recited in claim 13, wherein the at least one processor further:

according to an gasoline engine working in an equivalent mode or an enriched mode, obtains a statistical chemical equation of a gasoline combustion of the gasoline engine $CH_n + A[O_2 + xN_2 + yCO_2 + zH_2O] + B[aCO_2 + cH_2O + eO_2 + gCH_n + hN_2]$ (4), wherein n is a relative atomic ratio of hydrogen to carbon in gasoline, which is approximately equal to 1.87, A is the molar volume ratio of the air, B is molar volume ratio of an introduced exhaust gas, x is the relative volume of the nitrogen to the oxygen in the air, y is the relative volume of the carbon dioxide relative to the oxygen in the air, z is the relative volume of the water molecules relative to the oxygen in the air, a is the molar concentration of the carbon dioxide of the introduced exhaust gas, c is the molar concentration of the water molecules of the introduced exhaust gas, e is the molar concentration of the oxygen of the introduced exhaust gas, g is the molar concentration of hydrocarbons of the introduced exhaust gas, h is the molar concentration of hydrocarbons of the introduced exhaust gas;

according to the statistical chemical equation, determines a system of equations $$\begin{cases} a1 = \dfrac{1 + Ay}{1 - B1} - g1 \\ c1 = \dfrac{\dfrac{n}{2} + Az}{1 - B1} - \dfrac{ng1}{2} \\ g1 = \dfrac{1 + \dfrac{n}{4} - A}{(1 - B1) \cdot \left(1 + \dfrac{n}{4}\right)} \\ h1 = \dfrac{Ax}{1 - B1} \end{cases}; \quad (5)$$

substitutes the molar volume ratio of air into A of the system of equations, and substituting the molar concentration of the water molecules of a first introduced exhaust gas into c1, to calculate the molar concentration a1 of the carbon dioxide of a first introduced exhaust gas, the molar concentration e1 of the oxygen of the first introduced exhaust gas, the molar concentration g1 of the hydrocarbons of the first introduced exhaust gas, and the molar volume ratio B1 of the first introduced exhaust gas, where the exhaust gas processed by the EGR cooler under the maximum humidity limit value of the exhaust gas is the first introduced exhaust gas;

according to the molar volume ratio of air into A, the molar volume ratio B1 of the first introduced exhaust gas, the molar concentration a1 of the carbon dioxide of the first introduced exhaust gas, the molar concentration c1 of the water molecules of the first introduced exhaust gas, the molar concentration e1 of the oxygen of the first introduced exhaust gas, the molar concentration g1 of the hydrocarbons of the first introduced exhaust gas, calculates the allowable EGR rate of the exhaust gas processed by the EGR cooler under the maximum humidity limit value of the exhaust gas according to $$Z_{egr}1 = \frac{B1(a1M_{CO2} + c1M_{H2O} + g1M_{CHn} + h1M_{N2})}{A(M_{O2} + xM_{N2} + yM_{CO2} + zM_{H2O}) + B1(a1M_{CO2} + c1M_{H2O} + g1M_{CHn} + h1M_{N2})}$$

formula (6), wherein $Z_{egr}1$ is the allowable EGR rate of the exhaust gas processed by the EGR cooler under the maximum humidity limit value of the exhaust gas.

18. The vehicle as recited in claim 13, wherein the at least one processor further:

according to the gasoline engine working in an equivalent mode or an enriched mode, obtains a statistical chemical equation of the gasoline combustion of the gasoline engine $CH_n + A[O_2 + xN_2 + yCO_2 + zH_2O] + B[aCO_2 + cH_2O + eO_2 + gCH_n + hN_2]$ (4), wherein n is the relative atomic ratio of the hydrogen to the carbon in the gasoline, which is approximately equal to 1.87, A is the molar volume ratio of the air, B is the molar volume ratio of an introduced exhaust gas, x is the relative volume of the nitrogen to the oxygen in the air, y is the relative volume of the carbon dioxide relative to the oxygen in the air, z is the relative volume of the water molecules relative to the oxygen in the air, a is the molar concentration of the carbon dioxide of the introduced exhaust gas, c is the molar concentration of the water molecules of the introduced exhaust gas, e is the molar concentration of the oxygen of the introduced exhaust gas, g is the molar concentration of hydrocarbons of the introduced exhaust gas, h is the molar concentration of the hydrocarbons of the introduced exhaust gas;

according to the statistical chemical equation, determines the system of equations $$\begin{cases} a2 = \dfrac{1 + Ay}{1 - B2} - g2 \\ c2 = \dfrac{\dfrac{n}{2} + Az}{1 - B2} - \dfrac{ng2}{2} \\ g2 = \dfrac{1 + \dfrac{n}{4} - A}{(1 - B2) \cdot \left(1 + \dfrac{n}{4}\right)} \\ h2 = \dfrac{Ax}{1 - B2} \end{cases} \quad (7)$$

substitutes the molar volume ratio of air into A of the system of equations, and substitute the molar concentration of the water molecules of a second introduced exhaust gas into c2, to calculate the molar concentration a2 of the carbon dioxide of the second introduced exhaust gas, the molar concentration e2 of the oxygen of the second introduced exhaust gas, the molar concentration g2 of the hydrocarbons of the second introduced exhaust gas, and the molar volume ratio B2 of the second introduced exhaust gas, wherein the mixed gas before being processed by the supercharger and the compressor under the maximum humidity limit value of the mixed gas is the second introduced exhaust gas; according to the molar volume ratio of air into A, the molar volume ratio B2 of the second introduced exhaust gas, the molar concentration a2 of the carbon dioxide of the second introduced exhaust gas, the molar concentration c2 of the water molecules of the second introduced exhaust gas, the molar concentration e2 of the oxygen of the second introduced exhaust gas, the molar concentration g2 of the hydrocarbons of the second introduced exhaust gas, calculates the allowable EGR rate of the mixed gas before being processed by the supercharger and the compressor under the maximum humidity limit value of the mixed gas according to a $$Z_{egr}2 = \frac{B2(a2M_{CO2} + c2M_{H2O} + g2M_{CHn} + h2M_{N2})}{A(M_{O2} + xM_{N2} + yM_{CO2} + zM_{H2O}) + B2(a2M_{CO2} + c2M_{H2O} + g2M_{CHn} + h2M_{N2})}$$

formula (6), wherein, $Z_{egr}2$ is the allowable EGR rate of the mixed gas before being processed by the supercharger and the compressor under the maximum humidity limit value of the mixed gas.

\* \* \* \* \*